(12) United States Patent
Haruyama

(10) Patent No.: US 8,643,793 B2
(45) Date of Patent: Feb. 4, 2014

(54) PROJECTOR

(75) Inventor: Akihide Haruyama, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 49 days.

(21) Appl. No.: 13/416,811

(22) Filed: Mar. 9, 2012

(65) Prior Publication Data

US 2012/0236218 A1 Sep. 20, 2012

(30) Foreign Application Priority Data

Mar. 14, 2011 (JP) .................................. 2011-055172

(51) Int. Cl.
*G02F 1/1335* (2006.01)

(52) U.S. Cl.
USPC ............................................................ 349/5

(58) Field of Classification Search
USPC ............................................................ 349/5
See application file for complete search history.

(56) References Cited

U.S. PATENT DOCUMENTS

| 7,502,078 | B2* | 3/2009 | Suzuki ............................... | 349/8 |
|---|---|---|---|---|
| 2002/0015134 | A1 | 2/2002 | Sekine | |
| 2003/0227597 | A1 | 12/2003 | Silverstein et al. | |
| 2004/0263806 | A1 | 12/2004 | Silverstein et al. | |
| 2005/0213043 | A1 | 9/2005 | Nakashima et al. | |

FOREIGN PATENT DOCUMENTS

| JP | 2000-111839 A | 4/2000 |
|---|---|---|
| JP | 2003-57744 A | 2/2003 |
| JP | 2003-506746 A | 2/2003 |
| JP | 2003-241144 A | 8/2003 |
| JP | 2003-241194 A | 8/2003 |
| JP | 2004-46156 A | 2/2004 |
| JP | 2004-533644 A | 11/2004 |
| JP | 2005-250057 A | 9/2005 |
| JP | 2006-126458 A | 5/2006 |
| JP | 2008-275909 A | 11/2008 |
| WO | WO-01-09877 A | 2/2001 |
| WO | WO-02-95496 A | 11/2002 |
| WO | WO-2007-021981 A | 2/2007 |

* cited by examiner

*Primary Examiner* — Lucy Chien
(74) *Attorney, Agent, or Firm* — ALG Intellectual Property, LLC

(57) ABSTRACT

A projector includes: an illumination optical system which emits first light (green light); a reflection type first liquid crystal panel which modulates the first light emitted from the illumination optical system; a first wire grid element which is disposed at a position at which the first light modulated and reflected by the first liquid crystal panel is incident, which includes a plurality of metal wires extending so as to be almost parallel to a light-exit surface of the first liquid crystal panel, and in which the surface on which the first light is incident is inclined by an angle equal to or greater than 37° and less than 45° with respect to a normal direction of the light-exit surface of the first liquid crystal panel; a projection optical system which projects the first light modulated by the first liquid crystal panel and reflected from the first wire grid element.

5 Claims, 4 Drawing Sheets

PROJECTOR

BACKGROUND

1. Technical Field

The present invention relates to a projector.

2. Related Art

Hitherto, a reflection type projector has been known as one type of liquid crystal projector. For example, the reflection type projector includes an illumination optical system, a polarization beam splitter (hereinafter, referred to as a PBS), a reflection type liquid crystal panel, and a projection optical system. Light emitted from the illumination optical system is incident on the liquid crystal panel via the PBS. The PBS is generally disposed so as to form 45° with the normal direction of the liquid crystal panel. The light incident on the liquid crystal panel is modulated and reflected by the liquid crystal panel. The light reflected by the liquid crystal panel is incident again on the PBS and is split into polarized light for showing an image and polarized light for showing an inverted image. The projection optical system projects the polarized light for showing the image to a screen or the like to display the image.

The PBS according to the related art is configured such that two prisms with a dielectric multilayer film coated on an inclination surface of the right angle prism are adhered on the inclination surfaces. In recent years, a wire grid element having a smaller incident angle dependency of a polarized-light splitting function compared to the PBS according to the related art has been used. Therefore, the contrast ratio of the reflection type projector has been considerably improved (for example, see JP-T-2003-506746, JP-A-2005-250057, JP-A-2004-46156, and JP-A-2000-111839).

In a projector disclosed in JP-T-2003-506746, light emitted from an illumination optical system is reflected from a wire grid element and is incident on a liquid crystal panel and the light for showing an image in the light modulated by the liquid crystal panel is transmitted through the wire grid element and is projected. In a projector disclosed in JP-A-2005-250057, a wire grid element is disposed in a medium with a refractive index greater than 1. In a projector disclosed in JP-A-2004-46156, the contrast ratio can be optimized by rotating a wire grid element around the normal direction. In a projector disclosed in JP-A-2000-111839, since a wire grid element forms an angle greater than 45° with respect to the normal direction of a liquid crystal panel, an incident angle of light emitted from the liquid crystal panel with respect to the wire grid element is less than 45°.

In the projectors, the contrast ratio is expected to be newly improved, and thus the projectors using the above-described wire grid element have a margin for improvement.

SUMMARY

An advantage of some aspects of the invention is that it provides a projector capable of improving a contrast ratio.

According to an aspect of the invention, there is provided a projector including: an illumination optical system which emits first light; a reflection type first liquid crystal panel which modulates the first light emitted from the illumination optical system; a first wire grid element which is disposed at a position at which the first light modulated and reflected by the first liquid crystal panel is incident, which includes a plurality of metal wires extending so as to be almost parallel to a light-exit surface of the first liquid crystal panel within a surface on which the first light is incident, and in which the surface on which the first light is incident is inclined by an angle equal to or greater than 37° and less than 45° with respect to a normal direction of the light-exit surface of the first liquid crystal panel; and a projection optical system which projects the first light modulated by the first liquid crystal panel and reflected from the first wire grid element.

Specifically, as described in a first embodiment and the like, the inventors have found that a separation capability into P-polarized light and S-polarized light with respect to the first wire grid element is improved when the first wire grid element is inclined by an angle less than 45° with respect to the normal direction of the light-exit surface of the first liquid crystal panel. In the projector, the first wire grid element is inclined by an angle equal to or greater than 37° and less than 45° with respect to the normal direction of the light-exit surface of the first liquid crystal panel. Accordingly, it is possible to improve the contrast ratio of the first light in an image projected by the projection optical system.

In the projector, the illumination optical system may emit the first light and second light with a wavelength different from that of the first light. The projector may further include: a reflection type second liquid crystal panel which modulates the second light emitted from the illumination optical system; and a second wire grid element which is disposed at a position at which the second light modulated and reflected by the second liquid crystal panel is incident and which includes a plurality of metal wires extending so as to be almost parallel to a light-exit surface of the second liquid crystal panel within a surface on which the second light is incident. The projection optical system may project the first light modulated by the first liquid crystal panel and reflected from the first wire grid element and the second light modulated by the second liquid crystal panel and reflected from the second wire grid element. Visual sensitivity of the first light may be higher than that of the second light.

With such a configuration, since the contrast ratio of the first light with the visual sensitivity relatively higher between the first light and the second light projected by the projection optical system is improved, the contrast ratio can efficiently be improved.

In the projector, the second wire grid element may be inclined by an angle less than 45° with respect to a normal direction of the light-exit surface of the second liquid crystal panel.

With such a configuration, since both the contrast ratios of the first light and the second light projected by the projection optical system are improved, the contrast ratios can efficiently be improved.

In the projector, an angle of the first wire grid element with respect to the normal direction of the light-exit surface of the first liquid crystal panel may be equal to or greater than 39° and equal to or less than 43°.

With such a configuration, since the separation capability into the P-polarized light and S-polarized light with respect to the first wire grid element is considerably improved, the contrast ratios can be considerably improved.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
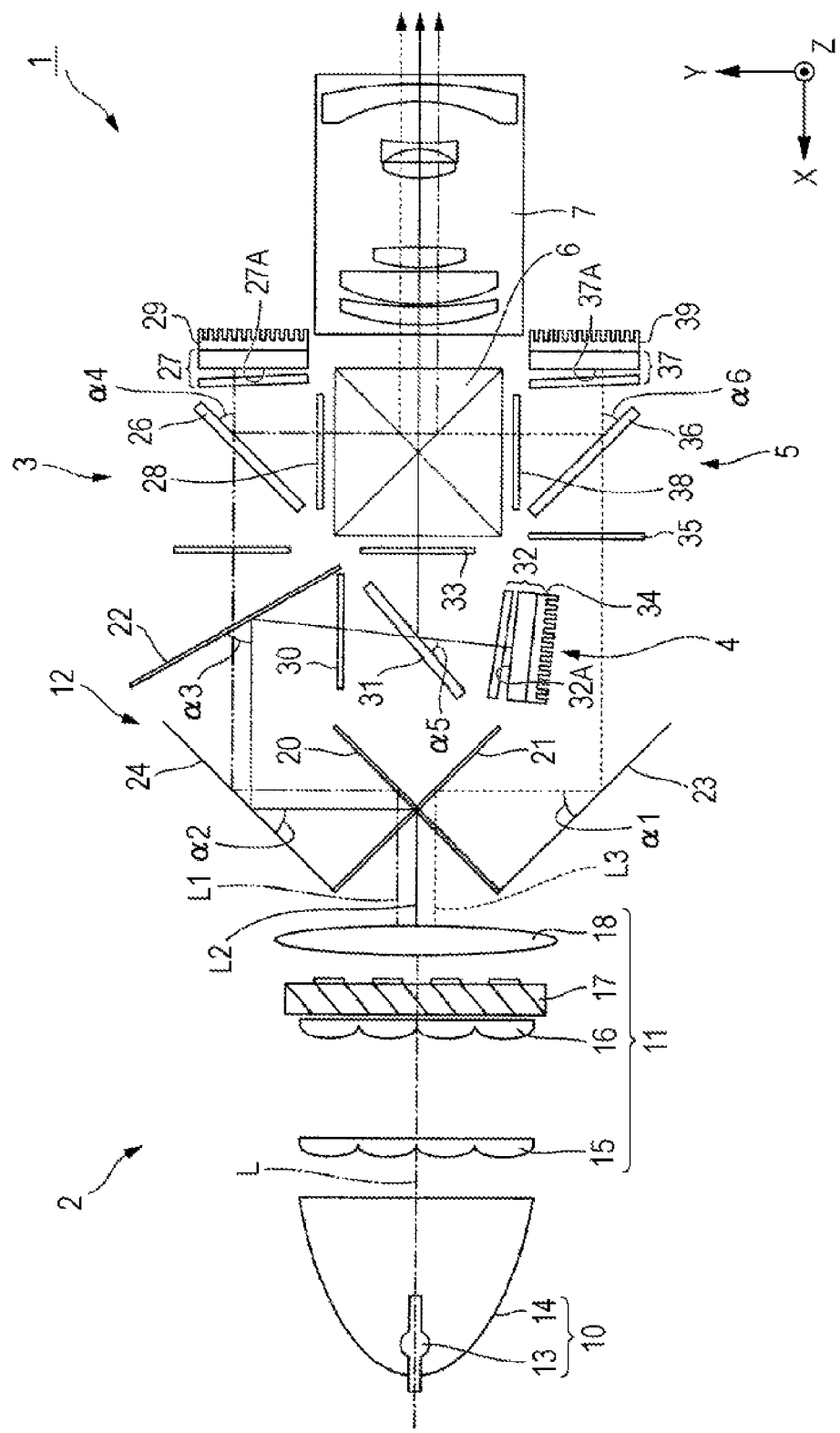
FIG. 1 is a diagram illustrating the overall configuration of a projector according to a first embodiment.

Hereinafter, embodiments of the invention will be described with reference to the drawings. The size or scale of the configuration in the drawings used for the description may be different from the actual size or scale.

First Embodiment

Figure 2:
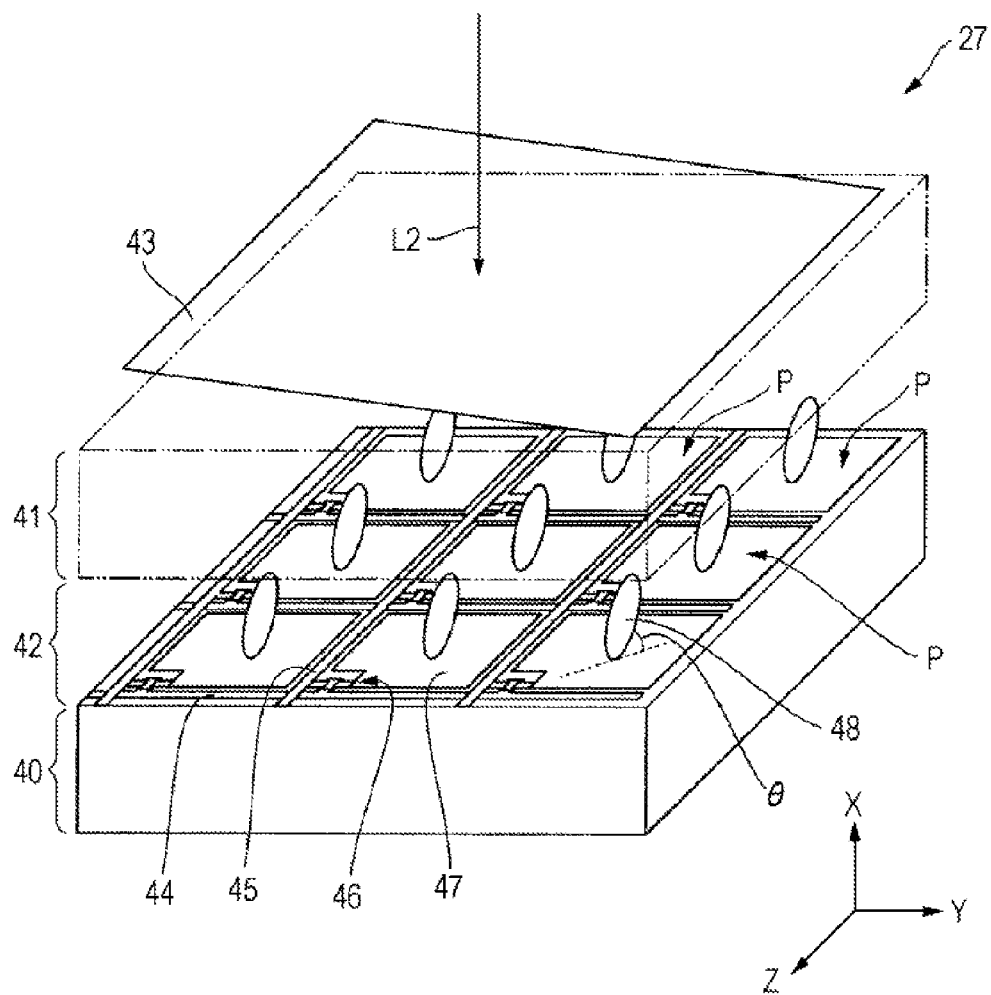
FIG. 2 is a diagram schematically illustrating the configuration of a liquid crystal panel.

FIG. 1 is a diagram illustrating the overall configuration of a projector according to a first embodiment. FIG. 2 is a diagram schematically illustrating the configuration of a liquid crystal panel. A projector 1 shown in FIG. 1 includes an illumination optical system 2, a blue image forming system 3, a green image forming system 4, a red image forming system 5, a color synthesizing unit (color synthesizing prism) 6, and a projection optical system 7.

The illumination optical system 2 can separately emit blue light (second light) L1, green light (first light) L2, and red light (third light) L3. The illumination optical system 2 according to this embodiment includes a light source unit 10, an integrator optical system 11, and a color separation optical system 12.

The light source unit 10 can emit white light L which includes the blue light L1 with a wavelength equal to or greater than 450 nm and less than 495 nm, the green light L2 with a wavelength equal to or greater than 495 nm and less than 570 nm, and the red light L3 with a wavelength equal to or greater than 620 nm and less than 750 nm. Among the blue light L1, the green light L2, and the red light L3, the green light L2 is color light which has the highest human visual sensitivity (the optical absorptance of human pyramidal cells). The integrator optical system 11 can uniformalize the illuminance of the white light L emitted from the light source unit 10 and align a polarized state. The color separation optical system 12 can separate the white light L emitted from the integrator optical system 11 into the blue light L1, the green light L2, and the red light L3.

The light source unit 10 according to this embodiment includes a light source lamp 13 that emits white light and a reflecting mirror 14 that has a reflection surface with a rotation paraboloid shape. The white light emitted from the light source lamp 13 is reflected in one direction from the reflecting mirror 14 and becomes a substantially parallel light flux. The light source lamp 13 is configured by, for example, a metal halide lamp, a xenon lamp, a high-pressure mercury lamp, or a halogen lamp. The light is incident on the integrator optical system 11 by the reflecting mirror 14. The reflecting mirror 14 may have a reflection surface with a rotation elliptical shape. In this case, a parallelizing lens may be used to parallelize the white light exiting from the reflecting mirror.

The integrator optical system 11 according to this embodiment includes a first lens array 15, a second lens array 16, a polarization converting element 17, and a superimposing lens 18.

The first lens array 15 and the second lens array 16 each have a plurality of microlenses arranged two-dimensionally on a plane perpendicular to the optical axis of the light source unit 10. The microlenses of the first lens array 15 are arranged to have a one-to-one correspondence relationship with the microlenses of the second lens array 16. The plurality of microlenses have a shape (here, a substantially rectangular shape), which is similar to that of an illumination region of each liquid crystal panel described below, on the plane perpendicular to the optical axis of the light source unit 10. The illumination region is a region which includes the entire pixel region where a plurality of pixels are arranged two-dimensionally in each liquid crystal panel. The light exit surface of each liquid crystal panel is a surface which is parallel to two arrangement directions of the pixels in the pixel region and is perpendicular to the thickness direction of a liquid crystal layer of each liquid crystal panel.

The polarization converting element 17 includes a plurality of cells arranged two-dimensionally on the plane perpendicular to the optical axis of the light source unit 10. The cells of the polarization converting element 17 are arranged to have a one-to-one correspondence relationship with the microlenses of the second lens array 16. The plurality of cells each have a polarization beam splitter film (hereinafter, referred to as a PBS film), a ½ phase plate, and a reflecting mirror.

The white light L incident on the first lens array 15 from the light source unit 10 is condensed into the respective microlenses and is divided into a plurality of partial light fluxes. The partial light flux exiting from each microlens of the first lens array 15 is imaged in the microlens of the second lens array 16 corresponding to this microlens to form a secondary light source in the microlens. The partial light flux exiting from each microlens of the second lens array 16 is incident on the cell of the polarization converting element 17 corresponding to this microlens.

The polarization converting element 17 is disposed in a light path between the second lens array 16 and the superimposing lens 18. The partial light flux incident on each cell of the polarization converting element 17 is separated into P-polarized light and S-polarized light for the PBS film. One polarized light flux separated from the partial light flux is reflected from the reflecting mirror, and then passes through the ½ phase plate so that the polarized state can be aligned with the other polarized light. In this embodiment, each cell of the polarization converting element 17 can align the polarized state of the partial light flux incident on each cell to the P-polarized light with respect to a wire grid element (which is described later) of each image forming system. The plurality of partial light fluxes emitted from the plurality of cells of the polarization converting element 17 are refracted by the superimposing lens 18, and thus are superimposed on the illumination region of the liquid crystal panel of each image forming system.

The color separation optical system 12 includes a first dichroic mirror 20, a second dichroic mirror 21, a third dichroic mirror 22, a first reflecting mirror 23, and a second reflecting mirror 24. The first dichroic mirror 20 has a property of transmitting the red light L3 and reflecting the green light L2 and the blue light L1. The second dichroic mirror 21 has a property of reflecting the red light L3 and transmitting the green light L2 and the blue light L1. The third dichroic mirror 22 has a property of reflecting the green light L2 and transmitting the blue light L1.

The first dichroic mirror 20 and the second dichroic mirror 21 are almost perpendicular to each other and are disposed to form nearly 45° with the optical axis of the integrator optical system 11.

In the white light L incident on the color separation optical system 12, the red light L3 is reflected from the second dichroic mirror 21, is turned by nearly 90° in its travel direction, and then is incident on the first reflection mirror 23. The first reflecting mirror 23 is inclined by an angle α1 with respect to the travel direction of the red light L3 from the second dichroic mirror 21 to the first reflecting mirror 23. In this embodiment, the angle α1 is set to be nearly 45° and the first reflecting mirror 23 is disposed to be almost parallel to the first dichroic mirror 20. The red light L3 incident on the first reflecting mirror 23 is reflected from the first reflecting mirror 23, is turned by nearly 90° in its travel direction, and is incident on the red image forming system 5.

In the white light L incident on the color separation optical system 12, the blue light L1 and the green light L2 are reflected from the first dichroic mirror 20, are turned by nearly 90° in their travel directions, travel toward the opposite side to the red light L3 with respect to the first dichroic mirror 20, and are incident on the second reflecting mirror 24.

The second reflecting mirror 24 is inclined by an angle α2 with respect to the travel direction of the blue light L1 and the green light L2 from the first dichroic mirror 20 to the second reflecting mirror 24. In this embodiment, the angle α2 is set to be nearly 45° and the second reflecting mirror 24 is disposed to be almost parallel to the second dichroic mirror 21. The blue light L1 and the green light L2 incident on the second reflecting mirror 24 is reflected from the second reflecting mirror 24, is turned by nearly 90° in their travel directions, and are incident on the third dichroic mirror 22.

The third dichroic mirror 22 is inclined by an angle α3 larger than 45° with respect to the travel directions of the blue light L1 and the green light L2 from the second reflecting mirror 24 to the third dichroic mirror 22. That is, an incident angle (90−α3) [°] of the blue light L1 and the green light L2 on the third dichroic mirror 22 is set to an angle less than 45°. The blue light L1 incident on the third dichroic mirror 22 passes through the third dichroic mirror 22 and is incident on the blue image forming system 3. The green light L2 incident on the third dichroic mirror 22 is reflected from the third dichroic mirror 22, is changed by 2×α3 [°] in its travel direction, travels in a non-perpendicular direction of a light path immediately before the green light L2 is incident on the third dichroic mirror 22, and then is incident on the green image forming system 4. Further, the color separation optical system 12 may have a configuration in which the white light is separated into a plurality of color light by a dichroic prism.

The blue image forming system 3 includes an incident-side polarizing plate 25, a wire grid element (a second wire grid element) 26, a liquid crystal panel (a second liquid crystal panel) 27, an exit-side polarizing plate 28, and a cooling plate 29.

The blue light L1 emitted from the color separation optical system 12 is incident on the incident-side polarizing plate 25, is incident on the wire grid element 26, is incident on the liquid crystal panel 27 so as to be modulated, is reflected from the liquid crystal panel 27, and is again incident on the wire grid element 26. In the blue light L1 incident on the wire grid element 26, the blue light L1 reflected from the wire grid element 26 is incident on the exit-side polarizing plate 28 from the wire grid element 26. In the blue light L1 incident on the exit-side polarizing plate 28 from the wire grid element 26, the blue light L1 passing through the exit-side polarizing plate 28 is incident on the color synthesizing unit 6.

The incident-side polarizing plate 25 has a property of transmitting linearly polarized light parallel to its transmission axis and absorbing linearly polarized light parallel to its absorption axis perpendicular to the transmission axis. The transmission axis of the incident-side polarizing plate 25 is set to be almost parallel to the polarization direction of the P-polarized light with respect to the wire grid element 26.

The wire grid element 26 includes a dielectric layer made of glass or the like and a plurality of metal wires extending in a direction parallel to a light exit surface 27A of the liquid crystal panel 27. The wire grid element 26 has a property of reflecting the linearly polarized light parallel to the plurality of metal wires and reflecting the linearly polarized light perpendicular to the plurality of metal wires. In this embodiment, the wire grid element 26 has a property of reflecting S-polarized light with respect to the wire grid element 26 and transmitting the P-polarized light with respect to the wire grid element 26.

The wire grid element 26 is inclined by an angle α4 with respect to the travel direction (light path) of the blue light L1 incident on the wire grid element 26 from the incident-side polarizing plate 25. In this embodiment, the angle α4 is set to be nearly 45°.

The liquid crystal panel 27 is disposed such that the light exit surface 27A is perpendicular to the travel direction of the blue light L1 passing through the wire grid element 26 and incident on the liquid crystal panel 27. The travel direction of the blue light L1 reflected from the liquid crystal panel 27 is changed by nearly 180° to be reversed to the travel direction immediately before the blue light L1 is incident on the liquid crystal panel 27. That is, the incident angle (90−α4) [°] of the blue light L1 reflected from the liquid crystal panel 27 on the wire grid element 26 is nearly 45°.

The cooling plate 29 is made of a metal material, such as an aluminum alloy, excellent in heat conductivity and includes a plurality of plate-shaped fins. The cooling plate 29 comes into contact with the liquid crystal panel 27 on the opposite side to the incident side on which the blue light L1 is incident on the liquid crystal panel 27. The cooling plate 29 can cool the heat of the liquid crystal panel 27 by a refrigerant such as air supplied from a fan (not shown).

As shown in FIG. 2, the liquid crystal panel 27 includes an element substrate 40, a counter substrate 41, a liquid crystal layer 42, and a compensating plate 43. The element substrate 40 is disposed to face the counter substrate 41. The liquid crystal layer 42 is sealed between the element substrate 40 and the counter substrate 41. The compensating plate 43 is disposed to be opposite to the liquid crystal layer 42 with respect to the counter substrate 41.

The liquid crystal panel 27 according to this embodiment is a reflection type liquid crystal panel. The blue light L1 passing through the wire grid element 26 from the incident-side polarizing plate 25 is incident on the compensating plate 43, passes through the counter substrate 41, is incident on the liquid crystal layer 42, and is reflected from the element substrate 40 to be reversed. The blue light L1 is modulated while passing through the liquid crystal layer 42, exits from the liquid crystal layer 42, is incident on the counter substrate 41, passes through the compensating plate 43, and exits from the liquid crystal panel 27.

The element substrate 40 is configured by a silicon substrate or a glass substrate as a base substrate. When the element substrate 40 is formed of a silicon substrate, a so-called LCOS (Liquid Crystal On Silicon) is configured. The element substrate 40 includes a plurality of gate lines 44, a plurality of source lines 45, a plurality of thin film transistors (hereinafter, referred to as TFTs 46), and pixel electrodes 47.

The plurality of gate lines 44 extend to be parallel to each other. The plurality of source lines 45 extends to be parallel to each other. The extension direction (an X direction) of the gate lines 44 intersects (here, is perpendicular to) the extension direction (a Z direction) of the source lines 45. The TFT 46 is disposed at each of the intersections between the gate lines 44 and the source lines 45. The gate line 44 is electrically connected to a gate electrode of the TFT 46. The source line 45 is electrically connected to a source region of the TFT 46.

A portion surrounded by the gate lines 44 and the source lines 45 corresponds to one pixel P. The pixel electrodes 47 are disposed so as to have a one-to-one correspondence relationship with the pixels P. In the liquid crystal panel 27, the plurality of pixels P are arranged in the direction in which the gate lines 44 extend and the direction in which the source lines 45 extend. The two arrangement directions of the plurality of pixels P are perpendicular to the thickness direction of the liquid crystal layer 42. The light exit surface 27A of the liquid crystal panel 27 is parallel to the two arrangement directions of the pixels P and is perpendicular to the thickness direction of the liquid crystal layer 42 of the liquid crystal panel 27.

In this embodiment, the pixel electrodes 47 made of a metal material also function as a mirror surface reflecting plate. FIG. 2 schematically shows the ground side of the pixel electrodes 47 by notching the pixel electrodes 47. In effect, the pixel electrodes 47 are configured to cover the gate lines 44, the source lines 45, and the TFTs 46 with a flattened layer or an insulation layer interposed therebetween, thereby improving an aperture ratio of the pixel P. The pixel electrode 47 is electrically connected to a drain region of the TFT 46. An alignment film (not shown) is disposed to cover the pixel electrode 47.

The counter substrate 41 is configured by a substrate, such as a glass substrate, having a transmission property as a base substrate. A common electrode made of a transparent conductive material such as indium tin oxide is disposed in the counter substrate 41 on the side of the liquid crystal layer 42. An alignment film is disposed in the common electrode on the side of the liquid crystal layer 42. The alignment film disposed in the element substrate 40 or the counter substrate 41 is an inorganic alignment film formed by, for example, an oblique evaporation method.

The liquid crystal layer 42 is configured by a VA mode liquid crystal layer. A cell gap between the element substrate 40 and the counter substrate 41 is, for example, about 2.0 µm. The liquid crystal material is sealed in the cell gap to form the liquid crystal layer 42. The liquid crystal material has negative dielectric constant anisotropy and birefringence Δn of, for example, 0.12. A liquid crystal molecule 48 included in the liquid crystal layer 42 has a pretilt angle θ of, for example, about 87° on the assumption that the direction of the substrate surface of the element substrate 40 is a reference (0°). The compensating plate 43 is formed of, for example, a negative C plate. The compensating plate 43 is disposed to be inclined by nearly 4.5° with respect to the direction of the substrate surface of the element substrate 40 so as to compensate a phase difference generated due to the pretilt of the liquid crystal molecules 48.

When a selection pulse is supplied to the gate line 44 in the liquid crystal panel 27 with the above-described configuration, the TFTs 46 connected to the gate line 44 are turned on. When the TFTs 46 are turned on, a source signal corresponding to a gray scale value of each pixel P is supplied to the source line 45 and the source signal is supplied to the pixel electrodes 47 via the TFTs 46. When the source signal is supplied to the pixel electrodes 47, an electric field is applied between the pixel electrodes 47 and the common electrode and an azimuth angle of the liquid crystal molecules 48 of the liquid crystal layer 42 is changed in each pixel P in accordance with the electric field. The polarization state of the blue light L1 incident on the pixel P is changed in accordance with the azimuth angle of the liquid crystal molecules 48 of the liquid crystal layer 42 in this pixel P.

In this embodiment, when the electric field is not applied to the liquid crystal layer 42 in one arbitrary pixel P, the polarization state of the blue light L1 incident on this pixel P is not nearly changed and the blue light L1 exits in a P polarization state. When the electric field is applied to the liquid crystal layer 42 in one arbitrary pixel P, the blue light L1 incident on this pixel P is changed from the P polarization to the S polarization with respect to the wire grid element 26 at a ratio corresponding to the gray scale value defined in image data. That is, in the blue light L1 passing through the liquid crystal layer 42, the S-polarized light with respect to the wire grid element 26 is light for showing an image.

In the blue light L1 exiting from the liquid crystal panel 27, the P-polarized light with respect to the wire grid element 26 passes through the wire grid element 26. In the blue light L1 exiting from the liquid crystal panel 27, the S-polarized light with respect to the wire grid element 26 is reflected from the wire grid element 26, is changed in its travel direction, and is incident on the exit-side polarizing plate 28.

Referring back to FIG. 1, the exit-side polarizing plate 28 has a property of transmitting the linearly polarized light parallel to the transmission axis and absorbing the linearly polarized light parallel to the absorption axis perpendicular to the transmission axis. The transmission axis of the exit-side polarizing plate 28 is set to be almost parallel to the polarization direction of the S-polarized light with respect to the wire grid element 26. In the blue light L1 incident on the exit-side polarizing plate 28, the S-polarized light with respect to the wire grid element 26 passes through the exit-side polarizing plate 28 and is incident on the color synthesizing unit 6.

The green image forming system 4 includes an incident-side polarizing plate 30, a wire grid element (a first wire gird element) 31, a liquid crystal panel (a first liquid crystal panel) 32, an exit-side polarizing plate 33, and a cooling plate 34.

The green light L2 emitted from the color separation optical system 12 is incident on the incident-side polarizing plate 30, is incident on the wire grid element 31, is incident on the liquid crystal panel 32 so as to be modulated, is reflected from the liquid crystal panel 32, and is again incident on the wire grid element 31. In the green light L2 incident on the wire grid element 31, the green light L2 reflected from the wire grid element 31 is incident on the exit-side polarizing plate 33 from the wire grid element 31. In the green light L2 incident on the exit-side polarizing plate 33 from the wire grid element 31, the green light L2 passing through the exit-side polarizing plate 33 is incident on the color synthesizing unit 6.

The incident-side polarizing plate 30 has a property of transmitting linearly polarized light parallel to its transmission axis and absorbing linearly polarized light parallel to its absorption axis perpendicular to the transmission axis. The transmission axis of the incident-side polarizing plate 30 is set to be almost parallel to the polarization direction of the P-polarized light with respect to the wire grid element 31.

The wire grid element 31 has the same configuration as that of the wire grid element 26 of the blue image forming system 3. The metal wires of the wire grid element 31 extend in a direction parallel to a light-exit surface 32A of the liquid crystal panel 32. The wire grid element 31 has a property of transmitting the P-polarized light with respect to the wire grid element 31 and reflecting the S-polarized light with respect to the wire grid element 31 in the incident green light L2.

The wire grid element 31 is inclined by an angle α5 with respect to the travel direction (light path) of the green light L2 incident on the wire grid element 31 from the incident-side polarizing plate 30. In this embodiment, the angle α5 is set to be in the range equal to or greater than 37° and less than 45°. The angle α5 may be set to be in the range equal to or greater than 38° and equal to or less than 44° or may be set to be in the range equal to or greater than 39° and equal to or less than 43°. In this embodiment, the sum (α3+α5) of the angles α3 and α5 is set to be nearly 90°.

The liquid crystal panel 32 has almost the same configuration as that of the liquid crystal panel 27 of the blue image forming system 3. The liquid crystal panel 32 is disposed such that the light exit surface 32A is perpendicular to the travel direction of the green light L2 passing through the wire grid element 31 and incident on the liquid crystal panel 32. The travel direction of the green light L2 reflected from the liquid crystal panel 32 is changed by nearly 180° to be reversed to the travel direction immediately before the green light L2 is incident on the liquid crystal panel 32. That is, the incident angle of the green light L2 reflected from the liquid crystal panel 32 on the wire grid element 31 is (90−α5) [°].

In the green light L2 incident on the wire grid element 31, the S-polarized light with respect to the wire grid element 31 is the green light L2 showing an image and is reflected from the wire grid element 31. The green light L2 reflected from the wire grid element 31 travels in a direction perpendicular to the blue light L1 travelling from the exit-side polarizing plate 28 to the color synthesizing unit 6 and is incident on the exit-side polarizing plate 33.

The exit-side polarizing plate 33 has a property of transmitting the linearly polarized light parallel to its transmission axis and absorbing the linearly polarized light parallel to its absorption axis perpendicular to the transmission axis. The transmission axis of the exit-side polarizing plate 33 is set to be almost parallel to the polarization direction of the S-polarized light with respect to the wire grid element 31.

The cooling plate 34 has almost the same configuration as that of the cooling plate 29 and can cool the heat of the liquid crystal panel 32, as in the cooling plate 29. The cooling plate 34 comes into contact with the liquid crystal panel 32 on the opposite side to the incident side on which the green light L2 is incident on the liquid crystal panel 32.

The red image forming system 5 includes an incident-side polarizing plate 35, a wire grid element (a third wire grid element) 36, a liquid crystal panel (a third liquid crystal panel) 37, an exit-side polarizing plate 38, and a cooling plate 39.

The red light L3 emitted from the color separation optical system 12 is incident on the incident-side polarizing plate 35, is incident on the wire grid element 36, is incident on the liquid crystal panel 37 so as to be modulated, is reflected from the liquid crystal panel 37, and is again incident on the wire grid element 36. In the red light L3 incident on the wire grid element 36, the red light L3 reflected from the wire grid element 36 is incident on the exit-side polarizing plate 38 from the wire grid element 36. In the red light L3 incident on the exit-side polarizing plate 38 from the wire grid element 36, the red light L3 passing through the exit-side polarizing plate 38 is incident on the color synthesizing unit 6.

The incident-side polarizing plate 35 has a property of transmitting linearly polarized light parallel to its transmission axis and absorbing linearly polarized light parallel to its absorption axis perpendicular to the transmission axis. The transmission axis of the incident-side polarizing plate 35 is set to be almost parallel to the polarization direction of the P-polarized light with respect to the wire grid element 36.

The wire grid element 36 has the same configuration as that of the wire grid element 26 of the blue image forming system 3. The metal wires of the wire grid element 36 extend in a direction parallel to a light-exit surface 37A of the liquid crystal panel 37. The wire grid element 36 is inclined by an angle α6 with respect to the travel direction (light path) of the red light L3 incident on the wire grid element 36 from the incident-side polarizing plate 35. In this embodiment, the angle α6 is set to nearly 45°.

The wire grid element 36 has a property of transmitting the P-polarized light with respect to the wire grid element 36 and reflecting the S-polarized light with respect to the wire grid element 36 in the incident red light L3.

The liquid crystal panel 37 has almost the same configuration as that of the liquid crystal panel 27 of the blue image forming system 3. The liquid crystal panel 37 is disposed such that the light exit surface 37A is perpendicular to the travel direction of the red light L3 passing through the wire grid element 36 and incident on the liquid crystal panel 37. The travel direction of the red light L3 reflected from the liquid crystal panel 37 is changed by nearly 180° to be reversed to the travel direction immediately before the red light L3 is incident on the liquid crystal panel 37.

The exit-side polarizing plate 38 has a property of transmitting the linearly polarized light parallel to its transmission axis and absorbing the linearly polarized light parallel to its absorption axis perpendicular to the transmission axis. The transmission axis of the exit-side polarizing plate 38 is set to be almost parallel to the polarization direction of the S-polarized light with respect to the wire grid element 36. The red light L3 passing through the exit-side polarizing plate 38 travels in the opposite direction so as to face the blue light L1 travelling from the exit-side polarizing plate 28 to the color synthesizing unit 6 and is incident on the color synthesizing unit 6.

The cooling plate 39 has almost the same configuration as that of the cooling plate 29 and can cool the heat of the liquid crystal panel 37, as in the cooling plate 29. The cooling plate 39 comes into contact with the liquid crystal panel 37 on the opposite side to the incident side on which the red light L3 is incident on the liquid crystal panel 32.

The color synthesizing unit 6 is configured by a dichroic prism or the like. The dichroic prism has a configuration in which four triangular prisms are adhered to each other. The surfaces to which the respective triangular prisms are adhered are the inner surfaces of the dichroic prism. In the dichroic prism, a wavelength selection film having a property of reflecting the red light L3 and transmitting the green light L2 and the blue light L1 and a wavelength selection film having a property of reflecting the blue light L1 and the transmitting the green light L2 and the red light L3 are perpendicular to each other to form the inner surfaces.

The green light L2 incident on the dichroic prism passes through the wavelength selection films and exits without any change. The blue light L1 and the red light L3 incident on the dichroic prism be selectively reflected from or pass through the wave selection films and exit in the same direction as the exit direction of the green light L2. In this way, the three-color light is superimposed and synthesized to form synthesized light for showing a full-color image, and then is incident on the projection optical system 7. The projection optical system 7 forms an image of the synthesized light on a projection surface to display the full-color image on the projection surface.

Next, the contrast ratio of the projector 1 according to this embodiment will be described.

Figure 3A:
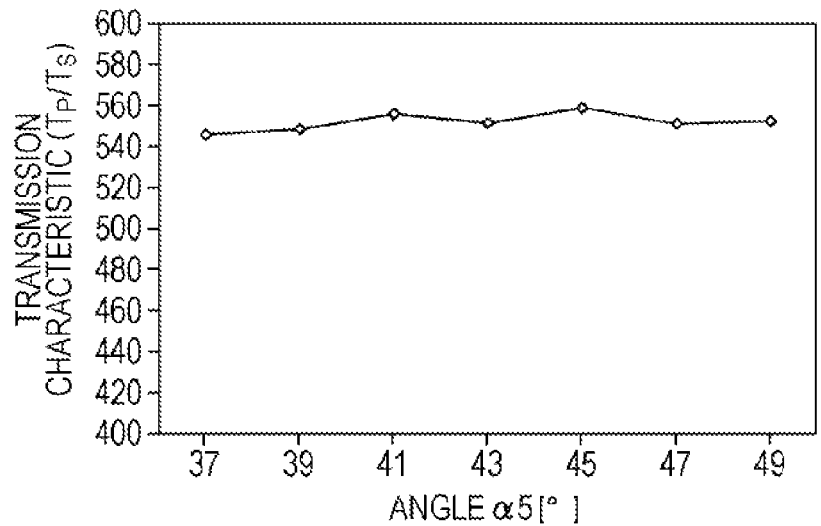
FIG. 3A is a graph illustrating an angle dependency of the transmission characteristic of a wire grid element.
Figure 3B:
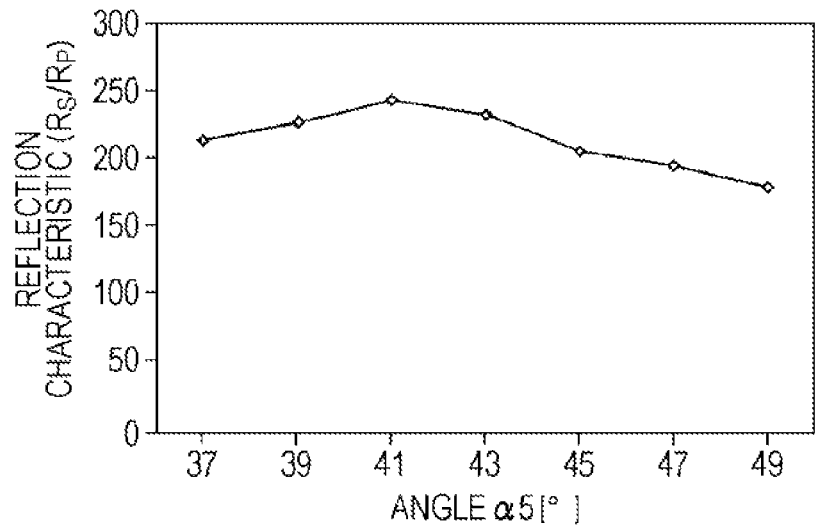
FIG. 3B is a graph illustrating an angle dependency of the reflection characteristic of the wire grid element.
Figure 3C:
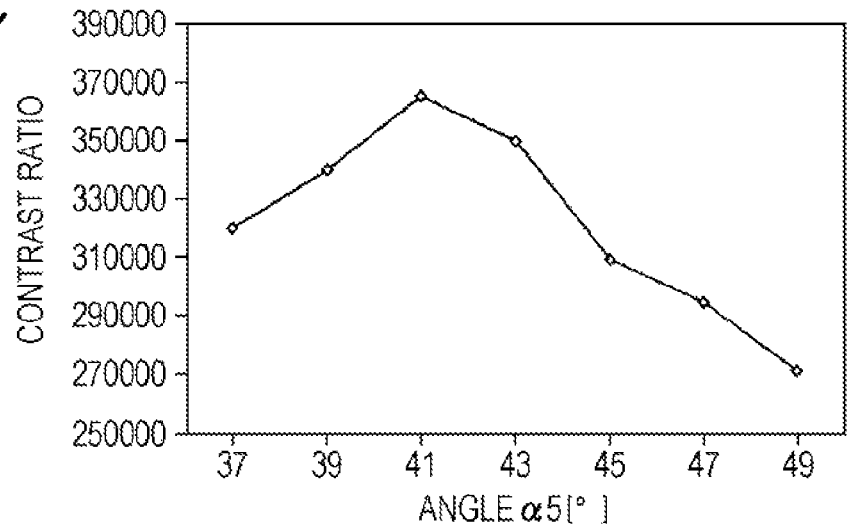
FIG. 3C is a graph illustrating a change in a contrast ratio of a projector when an angle formed between the normal direction of a light exit surface of the liquid crystal panel and the wire grid element is changed.

FIG. 3A is a graph illustrating an angle dependency of the transmission characteristic of the wire grid element. FIG. 3B is a graph illustrating an angle dependency of the reflection characteristic of the wire grid element. FIG. 3C is a graph illustrating a change in a contrast ratio of a projector when an angle formed between the normal direction of a light exit surface of the liquid crystal panel and the wire grid element is changed.

In the graphs of FIGS. 3A to 3C, the horizontal axis represents the angle α5 formed between the normal direction of the light-exit surface 32A of the liquid crystal panel 32 and the wire grid element 31. In FIG. 3A, the vertical axis represents a ratio ($T_P/T_S$) of the light amount ($T_P$) of P-polarized light passing through the wire grid element 31 to the light amount ($T_S$) passing through the wire grid element 31 in regard to the P-polarized light and the S-polarized light with the same light amount. In FIG. 3B, the vertical axis represents a ratio ($R_S/R_P$) of the light amount ($R_S$) of the S-polarized light reflected from and passing through the wire grid element 31 to the light amount ($R_P$) of P-polarized light reflected from the wire grid element 31 in regard to the P-polarized light and the S-polarized light with the same light amount. In FIG. 3C, the vertical axis represents a ratio (a contrast ratio) of the lightness of the pixels (white display) with the highest pixel value to the lightness of the pixels (black display) with the lowest pixel value.

As shown in the graph of FIG. 3A, the transmission characteristic ($T_P/T_S$) scarcely depends on the angle α5. On the other hand, as shown in the graph of FIG. 3B, the reflection characteristic ($R_S/R_P$) increases as the angle α5 decreases from 45°, becomes peak when the angle α5 is equal to 41°, and decreases when the angle α5 decreases from 41°. The black display characteristic increases (darker black is realized), as the transmission characteristic ($T_P/T_S$) increases. Moreover, the white display characteristic increases (brighter white is realized), as the reflection characteristic ($R_S/R_P$) increases. That is, the contrast ratio increases, as the transmission characteristic ($T_P/T_S$) increases and the reflection characteristic ($R_S/R_P$) increases.

In the projector 1 with the above-described configuration, the angle α5 is set to be equal to or greater than 37° and less than 45°. Therefore, since the reflection characteristic ($R_S/R_P$) is better than that of the configuration of "α5=45°", the contrast ratio can be improved. Further, the contrast ratio can be further improved, when the angle α5 is set to be equal to or greater than 38° and less than 44°. Furthermore, the contrast ratio can be considerably improved, when the angle α5 is set to be equal to or greater than 39° and less than 43°.

In the projector 1, the sum of the angle α3 and the angle α5 is set to be 90°. Therefore, the travel direction of the green light L2 incident on the color synthesizing unit 6 from the green image forming system 4 is perpendicular to the travel direction of the blue light L1 incident on the color synthesizing unit 6 from the blue image forming system 3 and the travel direction of the red light L3 incident on the color synthesizing unit 6 from the red image forming system 5. Accordingly, it is possible and easily superimpose and synthesize the blue light L1, the green light L2, the red light L3 with high precision. Further, since the color synthesizing unit 6 can be configured by a general dichroic prism, the apparatus cost can be lower compared to a case where a custom-tailored dichroic prism is used.

Further, the sum of the angle α3 and the angle α5 may not be set to be 90°. In this case, for example, the color synthesizing unit 6 includes a plurality of dichroic mirrors. Therefore, the positions of the dichroic mirrors may be set so that a plurality of color light travelling via the dichroic mirrors are superimposed on each other.

Among the blue light L1, the green light L2, and the red light L3, the green light L2 is color light which has the highest human visual sensitivity (the optical absorptance of human pyramidal cells). In the green image forming system 4 of the projector 1, the angle (α5) formed between the normal direction of the light-exit surface 32A of the liquid crystal panel 32 and the wire grid element 31 is set to be less than 45°, thereby efficiently improving the contrast ratio.

The reason that the reflection characteristic has a peak when the angle α5 is near 41° is not clear, but the following presumption can be made. Here, it is considered that light is incident on a glass in the air. A reflection ratio of the P-polarized light with respect to the incident angle decreases until the Brewster's angle (about 60°) even when the incident angle exceeds 45°. On the other hand, since the reflection ratio of the S-polarized light with respect to the incident angle monotonously increases. Therefore, when the incident angle exceeds 45°, a ratio of the S-polarized light to the P-polarized light reflected from the glass plate increases.

In general, the wire grid element is designed such that the reflection characteristic and the transmission characteristic are the maximum with respect to light with an incident angle of 45°. However, the actual characteristics of the wire grid element may be deviated from the theoretical characteristics due to a manufacture error or the like. That is, the wire grid element includes a dielectric layer, such as a glass, having a transmission property. Therefore, the reflection characteristic may have a peak within the range in which the incident angle is greater than 45° (the range in which the angle α5 is less than 45°), since the characteristics of the dielectric layer remain due to a manufacture error or the like.

When the processing or the design precision of the wire grid element is improved, there is a possibility that the actual characteristics of the wire grid element are close to the theoretical characteristics. In other words, in the projector 1 according to this embodiment, the characteristics of the wire grid element can be compensated even when the processing or the design precision of the wire grid element is not improved. Accordingly, it is possible to expect the advantage of reducing the manufacture cost while improving the contrast ratio of the projector 1.

Second Embodiment

Figure 4:
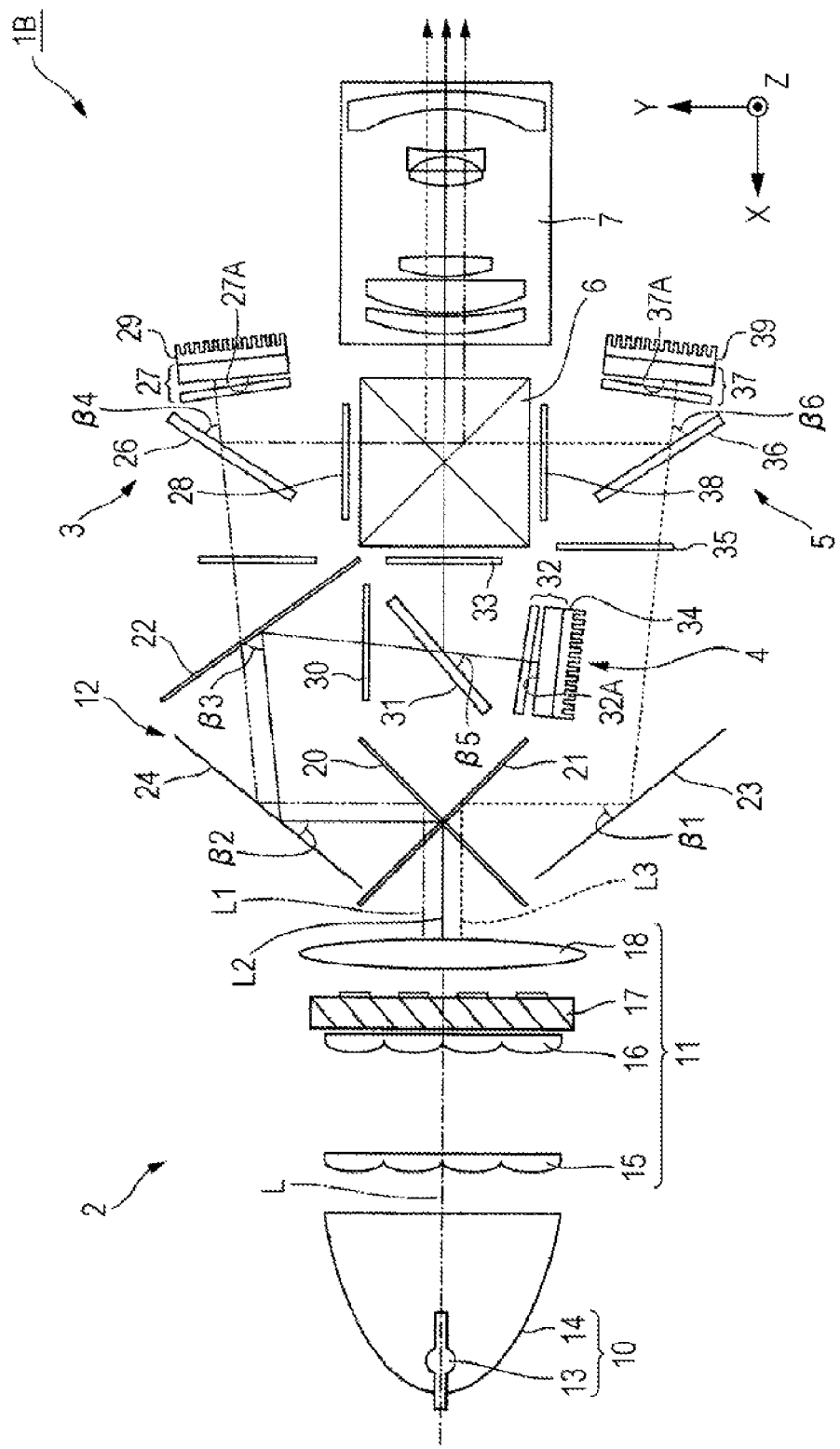
FIG. 4 is a diagram illustrating the overall configuration of a projector according to a second embodiment.

Next, a second embodiment will be described. FIG. 4 is a diagram illustrating the overall configuration of a projector according to the second embodiment. A projector 1B shown in FIG. 4 includes the same constituent elements as those of the first embodiment. In one of a blue image forming system 3, a green image forming system 4, and a red image forming system 5 of the projector 1B, the dispositions of the constituent elements of the first embodiment are changed so that the incident angle of color light reflected from a liquid crystal panel is greater than 45°. Hereinafter, the detailed description will be made.

The first reflection mirror 23 is inclined by an angle β1 less than 45° with respect to the travel direction of the red light L3 from the second dichroic mirror 21 to the first reflecting mirror 23. The second reflecting mirror 24 is inclined by an angle β2 less than 45° with respect to the travel direction of the blue light L1 and the green light L2 from the first dichroic mirror 20 to the second reflecting mirror 24. In this embodiment, the angle β1 is almost the same as the angle β2. The third dichroic mirror 22 is inclined by an angle β3 larger than 45° with respect to the travel directions of the blue light L1 and the green light L2 from the second reflecting mirror 24 to the third dichroic mirror 22.

In the blue image forming system 3, the wire grid element 26 is inclined by an angle β4 less than 45° with respect to the travel direction (light path) of the blue light L1 incident on the wire grid element 26 from the incident-side polarizing plate 25. In this embodiment, the angle β4 is almost the same as the angle β2. The liquid crystal panel 27 is disposed such that the light exit surface 27A is perpendicular to the travel direction of the blue light L1 passing through the wire grid element 26 and incident on the liquid crystal panel 27.

In the green image forming system 4, the wire grid element 31 is inclined by an angle β5 less than 45° with respect to the travel direction (light path) of the green light L2 incident on the wire grid element 31 from the incident-side polarizing plate 30. In this embodiment, the angle β5 is set so that the sum (β2+β3+β5) with the angles β2 and β3 is nearly 135°. The liquid crystal panel 32 is disposed such that the light exit surface 32A is perpendicular to the travel direction of the green light L2 passing through the wire grid element 31 and incident on the liquid crystal panel 32.

In the red image forming system 5, the wire grid element 36 is inclined by an angle β6 less than 45° with respect to the travel direction of the red light L3 incident on the wire grid element 36 from the incident-side polarizing plate 35. In this embodiment, the angle β6 is almost the same as the angle β1. The liquid crystal panel 37 is disposed such that the light exit surface 37A is perpendicular to the travel direction of the red light L3 passing through the wire grid element 36 and incident on the liquid crystal panel 37.

In the projector 1B with the above-described configuration, the wire gird element is inclined by an angle less than 45° with respect to the normal direction of the light-exit surface of each liquid crystal panel in each of the plurality of image forming systems, thereby considerably improving the contrast ratio. In the projector 1B, the lengths of the light paths of the respective color light from the light source unit 10 to the projection optical system 7 can be made uniform.

Since the angle β2 is almost the same as the angle β4 and the angle β1 is almost the same as the angle β6 in the projector 1B, the travel direction of the blue light L1 incident on the color synthesizing unit 6 from the blue image forming system 3 is almost parallel to the travel direction of the red light L3 incident on the color synthesizing unit 6 from the red image forming system 5. Further, since the sum of the angles β2, β3, and β5 is nearly 135°, the travel direction of the blue light L1 incident on the color synthesizing unit 6 from the blue image forming system 3 is almost perpendicular to the travel direction of the green light L2 incident on the color synthesizing unit 6 from the green image forming system 4. Accordingly, it is possible to easily superimpose and synthesize the blue light L1, the green light L2, and the red light L3 with high precision. Further, since the color synthesizing unit 6 can be configured by a general dichroic prism, the apparatus cost can be lower compared to the case where a custom-tailored dichroic prism is used.

The angle β2 may be different from the angle β4. The angle β1 may be different from the angle β6. The sum of the angles β2, β3, and β5 may not be 135°. In this case, for example, since the color synthesizing unit 6 is configured to include the plurality of dichroic mirrors, the positions of the dichroic mirrors may be set so that the plurality of color light travelling via the dichroic mirrors are superimposed on each other.

The technical scope of the invention is not limited to the above-described embodiments. The requisites described in the above-described embodiments may appropriately be combined. Further, at least one of the requisites described in the above-described embodiments may be omitted. The invention may be modified in various forms within the scope of the invention without departing from the gist of the invention.

In the first embodiment, in regard to one color light among the three-color light, the green light L2 is the color light with which the wire grid element forms the angle less than 45° with respect to the color light reflected from the liquid crystal panel of the image forming system corresponding to the color light. The blue light L1 or the red light L3 may be the one color light. In regard to two-color light among the three-color light, the wire grid element may form the angle less than 45° with respect to the color light reflected from the liquid crystal panel of the image forming system corresponding to each color light and the wire grid element may form the angle of nearly 45° with respect to the color light reflected from the liquid crystal panel of the image forming system corresponding to the other one color light.

In the above-described embodiments, the illumination optical system 2 is configured to separate the white light emitted from the light source lamp 13 into three-color light and illuminate each color image forming system for each color light, but the invention is not limited thereto. For example, the illumination optical system may be configured to include a solid-state light source, such as a laser diode or a light-emitting diode, directly emitting each color light and to illuminate each color image forming system by each color light emitted from each light solid-state light source. Further, the illumination optical system may be configured to include a solid-state light source emitting blue light or ultraviolet light and a fluorescent body receiving the source light emitted from the solid-state light source and to illuminate the image forming system by the light emitted from the fluorescent body. In this configuration, the illumination optical system may be configured to combine the light emitted from the solid-state light source and the light emitted from the fluorescent body and form the white light and to separate the white light into three-color light and illuminate each color image forming system for each color light. Furthermore, the illumination optical system may be configured to separate the blue light emitted from a solid-state light source into a plurality of light fluxes by a half mirror or the like and to illuminate the blue image forming system by one of the separated light fluxes and illuminate the other color image forming systems by the light obtained by converging the colors of the other separated light fluxes by a fluorescent body.

In the above-described embodiments, the contrast ratio may further be improved by adjusting the rotational angle around the travel direction of each color light being incident in one of the incident-side polarizing plate and the exit-side polarizing plate. Further, at least one of the incident-side polarizing plate and the exit-side polarizing plate may be perpendicular to the travel direction of each color light being incident or may be inclined by an angle less than 90° with respect to the travel direction of each color light being incident.

The entire disclosure of Japanese Patent Application No. 2011-055172, filed Mar. 14, 2011 is expressly incorporated by reference herein.

What is claimed is:

1. A projector comprising:
   an illumination optical system which emits first light;
   a reflection type first liquid crystal panel which modulates the first light emitted from the illumination optical system;
   a first wire grid element which is disposed at a position at which the first light modulated and reflected by the first liquid crystal panel is incident, which includes a plurality of metal wires extending so as to be almost parallel to a light-exit surface of the first liquid crystal panel within a surface on which the first light is incident, and in which the surface on which the first light is incident is inclined by an angle equal to or greater than 37° and equal to or less than 43° with respect to a normal direction of the light-exit surface of the first liquid crystal panel; and a projection optical system which projects the first light modulated by the first liquid crystal panel and reflected from the first wire grid element.

2. The projector according to claim 1, wherein the illumination optical system emits the first light and second light with a wavelength different from that of the first light, wherein the projector further comprises:

a reflection type second liquid crystal panel which modulates the second light emitted from the illumination optical system; and a second wire grid element which is disposed at a position at which the second light modulated and reflected by the second liquid crystal panel is incident and which includes a plurality of metal wires extending so as to be almost parallel to a light-exit surface of the second liquid crystal panel within a surface on which the second light is incident, wherein the projection optical system projects the first light modulated by the first liquid crystal panel and reflected from the first wire grid element and the second light modulated by the second liquid crystal panel and reflected from the second wire grid element, and wherein visual sensitivity of the first light is higher than that of the second light.

3. The projector according to claim 2, wherein the second wire grid element is inclined by an angle less than 45° with respect to a normal direction of the light-exit surface of the second liquid crystal panel.

4. A projector comprising:

an illumination optical system that emits first light;

a reflection type first liquid crystal panel;

a projection optical system that projects second light; and a first wire grid element that reflects third light from the reflection type first liquid crystal panel, reflected third light being the second light, the wire grid element including a plurality of metal wires that extend approximately parallel to a light exit surface of the reflection type liquid crystal panel, an angle between the first wire grid element and a normal direction of the light exit surface being equal or greater than 37° and equal to or less than 43°.

5. The projector according to claim 4, the first light being incident to the first wire grid element, a fourth light exiting from the first wire grid element to the reflection type liquid crystal panel, the fourth light being modulated to the third light by the reflection type first liquid crystal panel.

* * * * *